United States Patent
Qian et al.

(10) Patent No.: US 9,600,094 B2
(45) Date of Patent: Mar. 21, 2017

(54) APPARATUS, METHOD, AND PROGRAM PRODUCT FOR DIRECTING MOTION OF A WRITING DEVICE

(71) Applicant: LENOVO (Singapore) PTE, LTD., New Tech Park (SG)

(72) Inventors: Ming Qian, Cary, NC (US); Jian Li, Chapel Hill, NC (US); John Weldon Nicholson, Cary, NC (US); Song Wang, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 43 days.

(21) Appl. No.: 14/639,002

(22) Filed: Mar. 4, 2015

(65) Prior Publication Data

US 2016/0259435 A1 Sep. 8, 2016

(51) Int. Cl.
| | |
|---|---|
| G06F 3/01 | (2006.01) |
| G06F 3/0354 | (2013.01) |
| A63F 13/285 | (2014.01) |
| G06T 19/00 | (2011.01) |

(52) U.S. Cl.
CPC .......... G06F 3/03545 (2013.01); G06F 3/011 (2013.01); G06F 3/016 (2013.01); *A63F 13/285* (2014.09); *G06T 19/006* (2013.01)

(58) Field of Classification Search
CPC .......... G06F 3/016; G06F 3/011; G06F 3/014; G06F 3/03545; G06T 19/006; A63F 13/285; A63F 2300/1037; A63F 2300/8082
See application file for complete search history.

(56) References Cited

U.S. PATENT DOCUMENTS

| | | | | |
|---|---|---|---|---|
| 5,442,729 A | * | 8/1995 | Kramer | A61B 5/6806 128/925 |
| 5,790,108 A | * | 8/1998 | Salcudean | G06F 3/016 345/157 |
| 8,294,557 B1 | * | 10/2012 | El Saddik | G06F 3/016 340/407.1 |
| 2007/0091063 A1 | * | 4/2007 | Nakamura | G06F 3/016 345/156 |
| 2008/0055248 A1 | * | 3/2008 | Tremblay | G06F 3/011 345/158 |
| 2009/0102805 A1 | * | 4/2009 | Meijer | G06F 3/016 345/173 |

(Continued)

OTHER PUBLICATIONS

Rekimoto, Jun, Traxion: A Tactile Interaction Rekimoto, Jun, Traxion: A Tactile Interaction Device with Virtual Force Sensation, UIST'13 at St. Andrews UK, Oct. 11, 2013, see all, especially where highlighted.*

(Continued)

*Primary Examiner* — Michael J Eurice
(74) *Attorney, Agent, or Firm* — Kunzler Law Group (57) ABSTRACT

Apparatuses, methods, and program products are disclosed for directing motion of a writing device. By use of a processor, destination data corresponding to a destination placement for a writing device is received. Current data corresponding to a current placement of the writing device is also received. A mechanism that provides tactile feedback to the writing device is controlled to direct the writing device from the current placement toward the destination placement as a function of at least the destination data and the current data.

20 Claims, 6 Drawing Sheets

(56) References Cited

U.S. PATENT DOCUMENTS

| | | | | |
|---|---|---|---|---|
| 2010/0153082 | A1* | 6/2010 | Newman | G01N 33/5008 703/11 |
| 2010/0245237 | A1* | 9/2010 | Nakamura | A63F 13/02 345/156 |
| 2011/0227872 | A1* | 9/2011 | Huska | G06F 3/016 345/174 |
| 2014/0232646 | A1* | 8/2014 | Biggs | G06F 3/016 345/156 |
| 2015/0009023 | A1* | 1/2015 | Rekimoto | G08B 6/00 340/407.1 |
| 2015/0081110 | A1* | 3/2015 | Houston | G05D 19/02 700/280 |
| 2015/0196800 | A1* | 7/2015 | Macri | A63B 24/0021 482/8 |
| 2016/0026253 | A1* | 1/2016 | Bradski | G02B 27/225 345/8 |
| 2016/0144404 | A1* | 5/2016 | Houston | H02K 33/00 318/114 |

OTHER PUBLICATIONS

Jun Rekimoto, "SIGGRAPH 2014—Traxion, Emerging Technologies Contributor", Youtube, https://www.youtube.com/watch?v=kohAV1SJbyY, Aug. 20, 2014.

Jun Rekimoto, "Traxion: A Tactile Interaction Device with Virtual Force Sensation", UIST'13, Oct. 8-11, 2013, pp. 427-431.

* cited by examiner

FIG. 6

APPARATUS, METHOD, AND PROGRAM PRODUCT FOR DIRECTING MOTION OF A WRITING DEVICE

FIELD

The subject matter disclosed herein relates to writing devices and more particularly relates to directing motion of writing devices.

BACKGROUND

Description of the Related Art

Writing devices, such as pens, pencils, markers, styluses, crayons, brushes, and so forth, may be used to write, draw, paint, and/or trace. In certain circumstances, a writing device may be used to mimic a writing, drawing, painting, and/or style of another. For example, a writing device may be used to copy a writing, drawing, or painting made by another. As another example, a mentor may guide the hand of a person using a writing device to teach them a certain writing, drawing, and/or painting technique. Such techniques may help the person learn to write, draw, and/or paint. For example, such techniques may be used to teach a person letters, to teach a person a new language, to teach a person how to write symbols, and/or to teach a person to generate artistic works.

BRIEF SUMMARY

An apparatus for directing motion of a writing device is disclosed. A method and computer program product also perform the functions of the apparatus. In one embodiment, the apparatus includes a writing device, one or more processors, and memory that stores code executable by the one or more processors. The code, in various embodiments, receives destination data corresponding to a destination placement for the writing device. In a further embodiment, the code receives current data corresponding to a current placement of the writing device. The code may control a mechanism that provides tactile feedback to the writing device to direct the writing device from the current placement toward the destination placement as a function of at least the destination data and the current data.

In a further embodiment, the destination placement includes a destination position and the current placement includes a current position. In one embodiment, the destination placement includes a destination orientation and the current placement includes a current orientation. In some embodiments, the code that receives the destination data receives the destination data from a master writing device. In such an embodiment, the writing device may be a client writing device that mimics the motion of the master writing device based at least partly on the destination data received from the master writing device.

In another embodiment, the writing device is one of a pen, a pencil, a marker, a stylus, a crayon, and a brush. In a further embodiment, the apparatus is one of a tablet, a mobile phone, a handheld electronic device, a laptop, and a personal computer. Moreover, in certain embodiments, the code that controls the mechanism that provides the tactile feedback further calculates a time delay that is used to provide the tactile feedback. In such embodiments, the time delay compensates for time lag due to a master writing device providing the destination data from a location remote from the writing device.

A method for directing motion of a writing device, in one embodiment, includes receiving, by use of a processor, destination data corresponding to a destination placement for a writing device. In some embodiments, the method includes receiving current data corresponding to a current placement of the writing device. In a further embodiment, the method includes controlling a mechanism that provides tactile feedback to the writing device to direct the writing device from the current placement toward the destination placement as a function of at least the destination data and the current data.

In some embodiments, controlling the mechanism that provides tactile feedback to the writing device includes controlling the mechanism to provide tactile feedback to the writing device selected from one of a pen, a pencil, a marker, a stylus, a crayon, and a brush. In another embodiment, receiving the destination data includes receiving the destination data via the writing device. In such embodiments, receiving the current data includes receiving the current data via the writing device, and controlling the mechanism that provides the tactile feedback to the writing device includes controlling the mechanism via the writing device. In some embodiments, controlling the mechanism that provides the tactile feedback to the writing device further includes controlling the mechanism to one or more of provide directional tactile feedback, provide an increase in tactile feedback, and provide a decrease in tactile feedback.

In some embodiments, receiving the destination data further includes receiving one or more of a destination angle, a destination pressure, and a destination direction. In a further embodiment, receiving the destination data further includes receiving data from memory. In another embodiment, receiving the destination data further includes receiving data sensed using a camera. Furthermore, in certain embodiments, receiving the destination data further includes receiving data corresponding to a current placement of a master writing device. In some embodiments, controlling the mechanism that provides the tactile feedback to the writing device further includes controlling a motor within the writing device In one embodiment, a program product includes a computer readable storage medium that stores code executable by a processor. The executable code, in certain embodiments, includes code to receive destination data corresponding to a destination placement for a writing device. In a further embodiment, the executable code includes code to receive current data corresponding to a current placement of the writing device. The executable code, in some embodiments, includes code to control a mechanism that provides tactile feedback to the writing device to direct the writing device from the current placement toward the destination placement as a function of at least the destination data and the current data.

In certain embodiments, the code that performs receiving the destination data further performs receiving one or more of a destination angle, a destination pressure, and a destination direction. In some embodiments, the code that performs controlling the mechanism that provides the tactile feedback to the writing device further performs controlling the mechanism to provide one or more of directional tactile feedback, an increase in tactile feedback, and a decrease in tactile feedback. In further embodiments, the code that performs controlling the mechanism that provides the tactile feedback to the writing device further performs controlling a motor within the writing device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
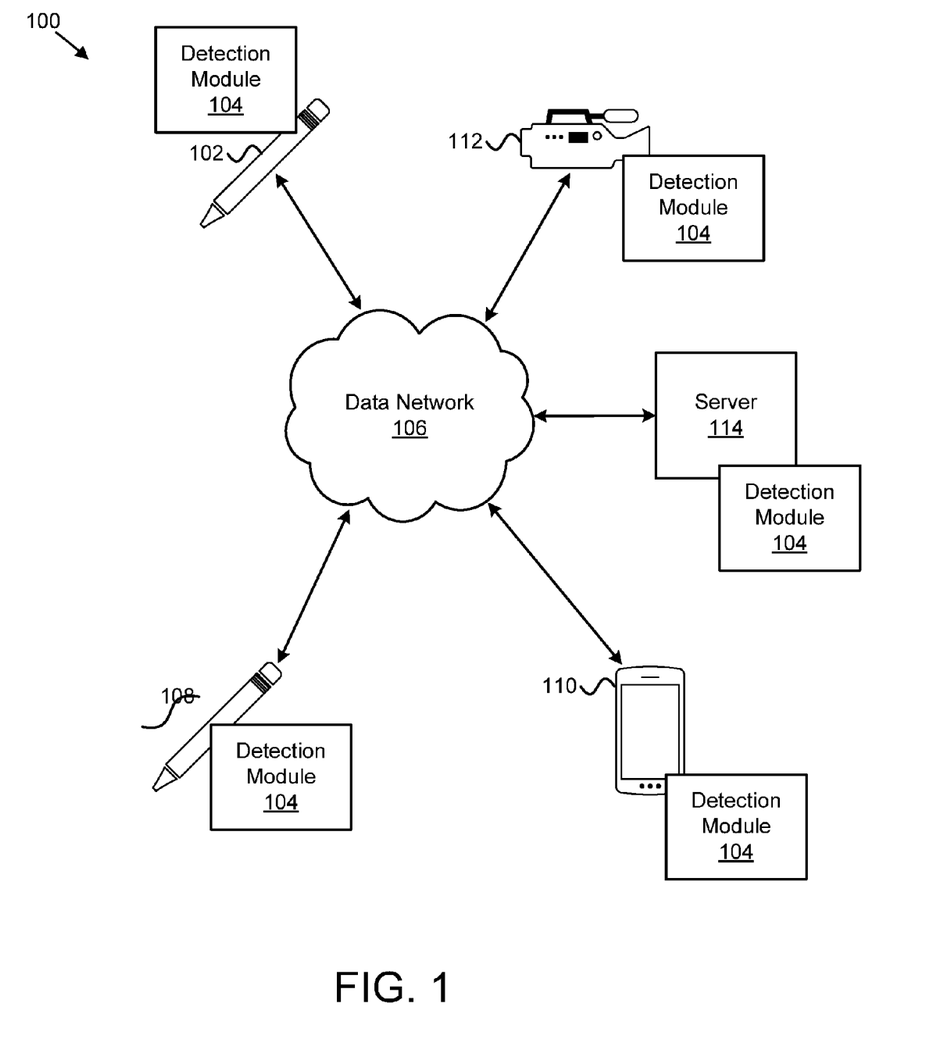
FIG. 1 is a schematic block diagram illustrating one embodiment of a system for directing motion of a writing device.

FIG. 1 depicts one embodiment of a system 100 for directing motion of a writing device. In one embodiment, the system 100 includes a master writing device 102, detection modules 104, a data network 106, a client writing device 108, a computing device 110, a camera 112, and a server 114. Even though a specific number of master writing devices 102, detection modules 104, data networks 106, client writing devices 108, computing devices 110, cameras 112, and servers 114 are depicted in FIG. 1, one of skill in the art will recognize that any number of master writing devices 102, detection modules 104, data networks 106, client writing devices 108, computing devices 110, cameras 112, and servers 114 may be included in the system 100.

In one embodiment, the master writing device 102 and/or the client writing device 108 may include any device suitable for writing, drawing, painting, and/or tracing, such as pens, pencils, markers, styluses, crayons, brushes, or the like. In certain embodiments, the client writing device 108 is configured to mimic movement of the master writing device 102.

For example, the system 100 may include code configured to receive destination data corresponding to a destination placement for the client writing device 108. As may be appreciated, the destination data may be derived from movement of the master writing device 102. As used herein, placement may be used to include position and/or orientation. Furthermore, the system 100 may include code configured to receive current data corresponding to a current placement of the client writing device 108 to produce comparison results. Moreover, the system 100 may include code configured to control a mechanism that provides tactile feedback to the client writing device 108 to direct the client writing device 108 from the current placement toward the destination placement as a function of at least the destination data and the current data. Thus, in such an example, an instructor using the master writing device 102 may remotely guide (e.g., in real-time) the writing, drawing, and/or painting of a student using the client writing device 108, such as while the student is writing, drawing, and/or painting.

In another example, an instructor may record movement of the master writing device 102 to be used to guide the writing, drawing, and/or painting of a student using the client writing device 108 in a playback mode. In yet another example, an instructor may generate a file containing destination data, such as by using computer software. The file may provide the destination data to be used to guide the writing, drawing, and/or painting of a student using the client writing device 108.

The master writing device 102, the client writing device 108, the computing device 110, the camera 112, and/or the server 114, may include an embodiment of the detection module 104. In certain embodiments, the detection module 104 is configured to detect a placement of the master writing device 102 and/or the client writing device 108. Furthermore, in some embodiments, the detection module 104 is configured to detect a color, an angle, a pressure, and/or a direction used by the master writing device 102 and/or the client writing device 108. The detection module 104 may use any suitable sensors, such as cameras 112, pressure sensors, accelerometers, gyroscopes, geospatial positioning, and so forth, to make its detections. As may be appreciated, the detections made by the detection module 104 are used to determine how to direct the motion of the client writing device 108.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, random access memory (RAM), or the like.

In certain embodiments, the computing device 110 may include any suitable device, such as a tablet, a mobile phone, a handheld electronic device, a laptop, and a personal computer. In some embodiments, the master writing device 102 and/or the client writing device 108 are used to write directly on the computing device 110, such as if the master writing device 102 and/or the client writing device 108 is a stylus, and if the computing device 110 is a tablet. The detection module 104 of the computing device 110 may detect the position, orientation, pressure, color, angle, and/or direction by sensing such elements using a touchscreen of the computing device 110, by using an internal camera, and/or by checking application software of the computing device 110 (e.g., to determine a color used).

The camera 112 may be used to capture one or more images of a master writing, drawing, and/or painting. Furthermore, in some embodiments, the one or more images captured by the camera 112 may be processed to determine a set of desired positions, orientations, colors, pressures, angles, and so forth to be used by the client writing device 108 (e.g., destination data). Moreover, in certain embodiments, the camera 112 may be used to capture images of the writing, drawing, painting, and/or tracing performed by the client writing device 108. In such embodiments, a current position, orientation, color, pressure, and angle may be determined (e.g., current data) for comparison with desired position, orientation, color, pressure, and angle.

In one embodiment, the server 114 includes computing devices, such as desktop computers, laptop computers, mainframe computers, cloud servers, virtual servers, and/or the like. In some embodiments, the server 114 is configured as an application server, email server, database server, file server, game server, home server, media server, web server, and/or the like. The server 114 may include the detection module 104 and may perform one or more operations of the detection module 104. In certain embodiments, the server 114 may determine a set of desired positions, orientations, colors, pressures, angles, and so forth to be used by the client writing device 108 using one or more image inputs. For example, the server 114 may receive an image of a completed writing, drawing, and/or painting, and may determine a set of desired positions, orientations, colors, pressures, angles, and so forth (e.g., destination data) to be used to direct the client writing device 108 to recreate the completed writing, drawing, and/or painting.

Figure 2:
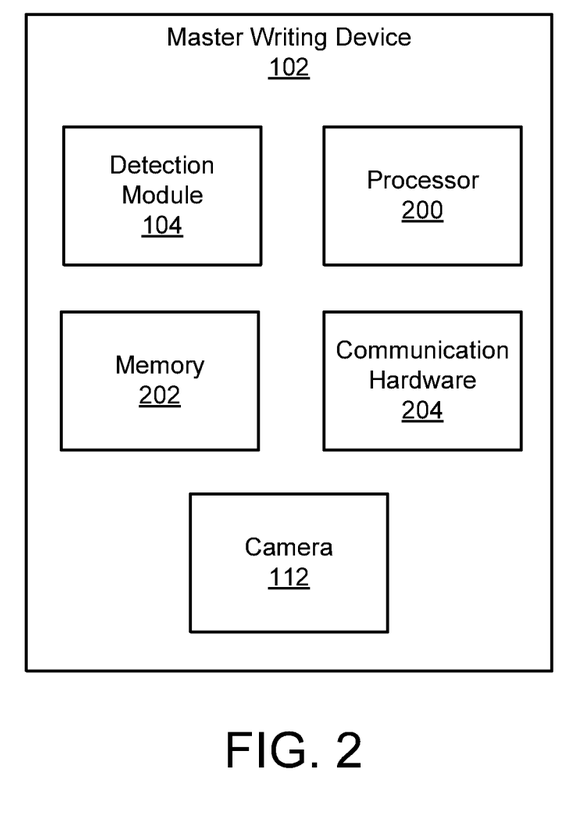
FIG. 2 is a schematic block diagram illustrating one embodiment of the master writing device of FIG. 1.

FIG. 2 depicts one embodiment of the master writing device 102 of FIG. 1. The master writing device 102 may contain the detection module 104, a processor 200, a memory 202, communication hardware 204, and the camera 112. The processor 200, in one embodiment, may include any known controller capable of executing computer-readable instructions and/or capable of performing logical operations. For example, the processor 200 may be a microcontroller, a microprocessor, a central processing unit (CPU), a graphics processing unit (GPU), an auxiliary processing unit, a field programmable gate array (FPGA), or similar programmable controller. In some embodiments, the processor 200 executes instructions stored in the memory 202 to perform the methods and routines described herein. The processor 200 is communicatively coupled to the memory 202, the detection module 104, the communication hardware 204, and the camera 112.

The memory 202, in one embodiment, is a computer readable storage medium. In some embodiments, the memory 202 includes volatile computer storage media. For example, the memory 202 may include a random access memory (RAM), including dynamic RAM (DRAM), synchronous dynamic RAM (SDRAM), and/or static RAM (SRAM). In some embodiments, the memory 202 includes non-volatile computer storage media. For example, the memory 202 may include a hard disk drive, a flash memory, or any other suitable non-volatile computer storage device. In some embodiments, the memory 202 includes both volatile and non-volatile computer storage media.

In some embodiments, the memory 202 stores data relating to a recorded writing, drawing, and/or painting. For example, the memory 202 may store an image of a writing, drawing, and/or painting, positions and/or orientations for a writing, drawing, and/or painting, and/or any other suitable data. In some embodiments, the memory 202 also stores program code and related data, such as an operating system or other controller algorithms operating on the master writing device 102. The master writing device 102 may use the detection module 104 to detect positions, orientations, pressures, angles, directions, and/or colors of a master writing, drawing, and/or painting.

As may be appreciated, the detection module 104 may include sensors, computer hardware, computer software, or a combination of both computer hardware and computer software. For example, the detection module 104 may include circuitry, or a processor, configured to detect placement, positions, orientations, pressures, angles, directions, and/or colors of a master writing, drawing, and/or painting.

The communication hardware 204 may communicate with other devices. For example, the communication hardware 204 may enable communication via Bluetooth®, Wi-Fi, and so forth. In certain embodiments, the master writing device 102 may communicate directly with the client writing device 108 and/or the computing device 110 using Bluetooth®, or any other suitable type of communication. Furthermore, the camera 112 may be used to capture images of the writing, drawing, and/or painting. As discussed previously, the images may be used to determine placement, positions, orientations, pressures, angles, directions, and/or colors used to create the writing, drawing, and/or painting.

Figure 3:
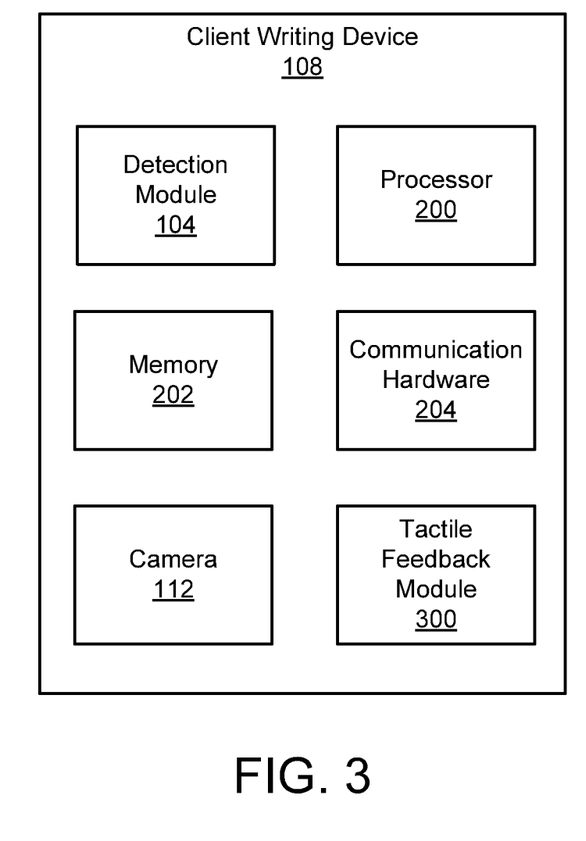
FIG. 3 is a schematic block diagram illustrating one embodiment of the client writing device of FIG. 1.

FIG. 3 depicts a schematic block diagram illustrating one embodiment of the client writing device 108 of FIG. 1. The client writing device 108 may contain the detection module 104, the processor 200, the memory 202, the communication hardware 204, the camera 112, and a tactile feedback module 300. As discussed previously, the detection module 104 may be used to sense the current placement, position, orientation, pressure, angle, direction, and/or color used by the client writing device 108. The processor 200, the memory 202, the communication hardware 204, and the camera 112 may function similar to those described in relation to FIG. 2. Furthermore, in certain embodiments, the client writing device 108 may communicate directly with the master writing device 102 and/or the computing device 110 using Bluetooth®, or any other suitable type of communication.

In certain embodiments, the processor 200 may receive destination data corresponding to a destination placement for the client writing device 108. The processor 200 may receive current data corresponding to a current placement of the client writing device 108. Moreover, the processor 200 may provide control signals to control the tactile feedback module 300 which provides tactile feedback to the client writing device 108 to direct the client writing device 108 from the current placement toward the destination placement as a function of at least the destination data and the current data. In some embodiments, the processor 200 may compare the destination data to the current data to produce comparison results. In such embodiments, the processor 200 may provide control signals to control the tactile feedback module 300 to direct the client writing device 108 from the current placement toward the destination placement based at least partly on the comparison results. It should be noted that, while in certain embodiments, the processor 200 of the client writing device 108 may receive the destination data and receive the current data, in other embodiments, any of the master writing device 102, the computing device 110, the camera 112, and the server 114 may receive the destination data, receive the current data, and/or provide control signals to the tactile feedback module 300.

Figure 4:
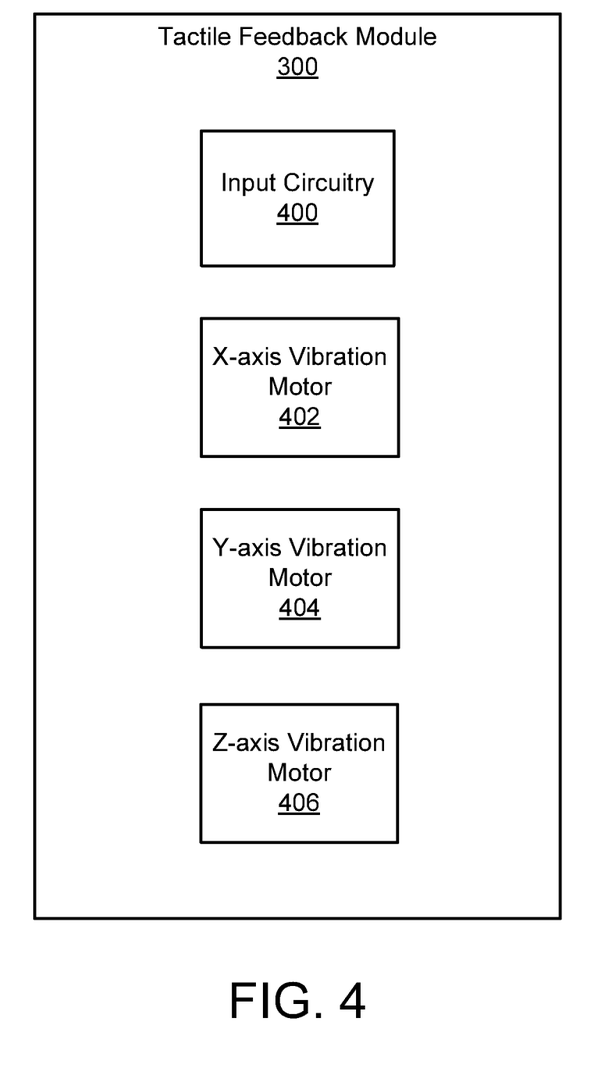
FIG. 4 is a schematic block diagram illustrating one embodiment of the tactile feedback module of FIG. 3.

FIG. 4 is a schematic block diagram illustrating one embodiment of the tactile feedback module 300 of FIG. 3. The tactile feedback module 300 includes input circuitry 400 configured to receive control signals used to control the tactile feedback provided by the tactile feedback module 300. In the illustrated embodiment, the tactile feedback module 300 includes at least one x-axis vibration motor 402, at least one y-axis vibration motor 404, and at least one z-axis vibration motor 406. In other embodiments, the tactile feedback module 300 may contain fewer or more vibration motors. Furthermore, in some embodiments, the tactile feedback module 300 may contain any suitable electronic device to provide tactile feedback, such as any suitable tactile actuator.

The tactile feedback module 300 may provide feedback to guide the client writing device 108 to any position, orientation, angle, pressure, direction, and so forth. This is done by applying appropriate signals to the at least one x-axis vibration motor 402, the at least one y-axis vibration motor 404, and the at least one z-axis vibration motor 406. For example, rotation of the at least one x-axis vibration motor 402 in a first direction may direct the client writing device 108 in a +x direction, while rotation of the at least one x-axis vibration motor 402 in a second direction may direct the client writing device 108 in a −x direction. As another example, a speed of rotation of the at least one x-axis vibration motor 402 in the first direction may direct the client writing device 108 in the +x direction at a certain speed that may be increased and/or decreased based on an increase and/or decrease in the speed of rotation of the at least one x-axis vibration motor 402.

In some embodiments, the tactile feedback provided by the tactile feedback module 300 may be considered a directional force illusion. For example, in one embodiment, an asymmetric signal may be applied to a tactile actuator so that the client writing device 108 feels like is being pulled, or pushed, in a particular direction, without there being a mechanical connection between the client writing device 108 and another object, or the ground. Using directional force illusion, a person using the client writing device 108 may be able to rely on the directional force to receive cues and/or guidance for drawing, writing, and/or painting.

Figure 5:
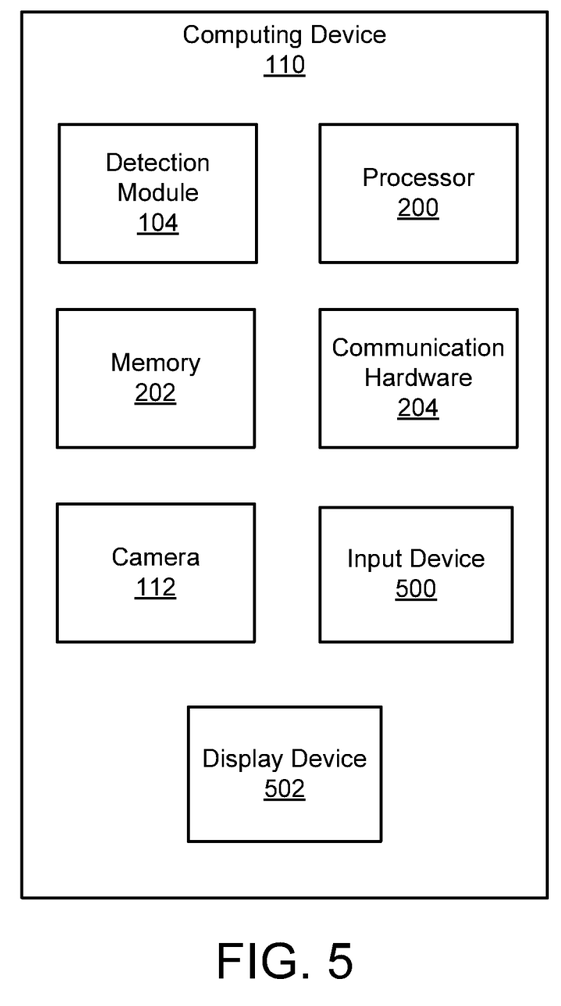
FIG. 5 is a schematic block diagram illustrating one embodiment of the computing device of FIG. 1.

FIG. 5 is a schematic block diagram illustrating one embodiment of the computing device 110 of FIG. 1. The computing device 110 may contain the detection module 104, the processor 200, the memory 202, the communication hardware 204, the camera 112, an input device 500, and a display device 502. As discussed previously, the detection module 104 may be used to sense the placement, position, orientation, pressure, angle, direction, and/or color used by the master writing device 102 and/or the client writing device 108. The processor 200, the memory 202, the communication hardware 204, and the camera 112 may function similar to those described in relation to FIG. 2.

The input device 500, in one embodiment, may include any known computer input device including a touch panel, a button, a keyboard, or the like. For example, the input device 500 may include a handwriting input unit operatively coupled to the processor 200. In some embodiments, the input device 500 may be integrated with the display device 502, for example, as a touchscreen or similar touch-sensitive display. In some embodiments, the input device 500 includes a touchscreen such that text may be input using a virtual keyboard displayed on the touchscreen and/or by handwriting on the touchscreen. In some embodiments, the input device 500 includes two or more different devices, such as a keyboard and a touch panel.

The display device 502, in one embodiment, may include any known electronically controllable display. The display device 502 may be configured to output visual, audible, and/or tactile signals. In some embodiments, the display device 502 includes an electronic display capable of outputting visual data to a user. For example, the display device 502 may include, but is not limited to, an LCD display, an LED display, an OLED display, a projector, or similar display device capable of outputting images, text, or the like to a user. As another, non-limiting, example, the display device 502 may include a wearable display such as a smart watch, smart glasses, a heads-up display, or the like. Further, the display device 502 may be a component of a smart phone, a personal digital assistant, a television, a table computer, a notebook (laptop) computer, a personal computer, a vehicle dashboard, or the like.

In certain embodiments, the display device 502 includes one or more speakers for producing sound. For example, the display device 502 may produce an audible alert or notification (e.g., a beep or chime) upon completion of a writing, drawing, and/or painting. In some embodiments, the display device 502 includes one or more haptic devices for producing vibrations, motion, or other tactile feedback. For example, the display device 502 may produce tactile feedback that is felt by the client writing device 108 and used to direct motion of the client writing device 108.

In some embodiments, all or portions of the display device 502 may be integrated with the input device 500. For example, the input device 500 and the display device 502 may form a touchscreen or similar touch-sensitive display. In other embodiments, the display device 502 may be located near the input device 500. In certain embodiments, the display device 502 may receive instructions and/or data for output from the processor 200 and/or the detection module 104.

In some embodiments, the computing device 110 may be configured to sense and/or record destination data, such as destination data input using the input device 500. For example, the master writing device 102 may be a stylus, and the computing device 110 may be a tablet. In such an embodiment, the computing device 110 may sense and/or record appropriate placement of the master writing device 102 used to write, draw, and/or paint.

In some embodiments, the computing device 110 may be configured to sense current data of the client writing device 108. For example, the client writing device 108 may be a stylus, and the computing device 110 may be a tablet. In such an embodiment, the computing device 110 may sense placement of the client writing device 108, compare the sensed placement of the client writing device 108 with destination data to produce comparison results, and provide a tactile feedback to the client writing device 108 to direct the client writing device 108 toward the destination placement based at least partly on the comparison results.

Figure 6:
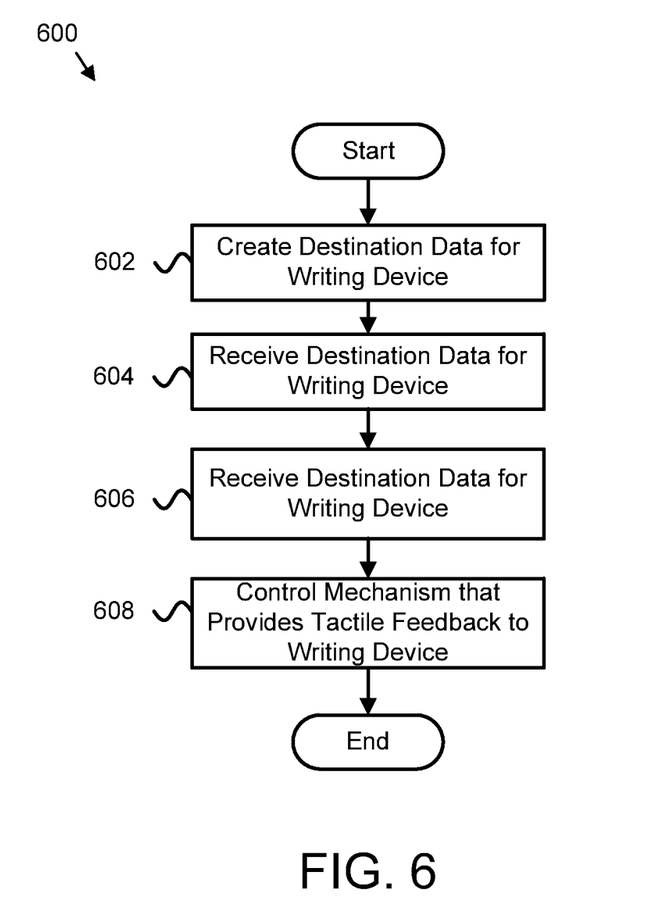
FIG. 6 is a schematic flow chart diagram illustrating one embodiment of a method for directing motion of a writing device.

FIG. 6 depicts a schematic flow chart diagram illustrating one embodiment of a method 600 for directing motion of a writing device. In some embodiments, the method 600 is performed by a writing device, such as the client writing device 108 described above with reference to FIGS. 1 and 3. In other embodiments, the method 600 may be performed by any combination of the master writing device 102, the client writing device 108, the computing device 110, the camera 112, and the server 114, described above with reference to FIGS. 1, 2, 3, and 5. In certain embodiments, the method 600 may be performed by a processor executing program code, for example, a microcontroller, a microprocessor, a central processing unit (CPU), a graphics processing unit (GPU), an auxiliary processing unit, a field programmable gate array (FPGA), or the like.

The method 600 begins with creating 602 destination data for a writing device. For example, in one embodiment, the destination data may be created 602 by recording destination data produced by the master writing device 102. In another embodiment, the destination data may be created 602 by transmitting real-time data produced by the master writing device 102. In a further embodiment, the destination data may be created 602 by taking images of a writing, drawing, and/or painting as the master writing device 102 is writing, drawing, and/or painting, then analyzing the images to determine the destination data. In yet another embodiment, the destination data may be created 602 using a completed writing, drawing, and/or painting that is analyzed to determine the destination data. Furthermore, in one embodiment, the destination data is created by an instructor creating a data file using a computer software application.

The method 600 continues with receiving 604, such as by use of the processor 200, the destination data corresponding to a destination placement for the client writing device 108. In some embodiments, the destination data includes a destination position, a destination orientation, a destination angle, a destination pressure, and/or a destination direction. In certain embodiments, the destination data may be received from memory, such as the memory 202. Furthermore, in some embodiments, the destination data may be data that was sensed using a camera, such as the camera 112. Moreover, in certain embodiments, the destination data may be data corresponding to a current placement of the master writing device 102. The current placement of the master writing device 102 may include the position and/or the orientation of the master writing device 102, among other things. In such embodiments, the destination data may be received from the master writing device 102. Moreover, the client writing device 108 may be configured to mimic the motion of the master writing device 102 based at least partly on the destination data received from the master writing device 102.

The method 600 includes receiving 606 a current placement of the client writing device 108. Moreover, the method 600 includes controlling 608 a mechanism that provides tactile feedback to the client writing device 108 to direct the client writing device 108 from the current placement toward the destination placement based at least partly on the comparison results.

As may be appreciated, controlling 608 the mechanism that provides tactile feedback to the client writing device 108 may include controlling 608 the mechanism to one or more of provide directional tactile feedback (e.g., tactile feedback that directs the client writing device 108 toward a particular position and/or orientation), provide an increase in tactile feedback, provide a decrease in tactile feedback, provide a change in direction in tactile feedback, and/or otherwise providing a change in tactile feedback. In certain embodiments, controlling 608 the mechanism that provides tactile feedback includes controlling a tactile actuator and/or one or more motors of the client writing device 108 and/or the computing device 110.

In some embodiments, controlling 608 the mechanism that provides tactile feedback includes calculating a time delay to be used to provide the tactile feedback. For example, while the client writing device 108 is being directed real-time by the master writing device 102 from a location remote from the client writing device 108, there may be a time delay between the master writing device 102 moving and the client writing device 108 receiving data corresponding to the master writing device 102 moving. Accordingly, the master writing device 102 may communicate with the client writing device 108 to determine a time delay factor that exists between the communication of the master writing device 102 and the client writing device 108. The client writing device 108 may use this time delay factor to delay controlling 608 the mechanism that provides tactile feedback by a period of time (e.g., time lag) to appropriately synchronize the tactile feedback with the placement of the client writing device 108.

As may be appreciated, creating 602 the destination data, receiving 604 the destination data, receiving 606 the current data, and controlling 608 the mechanism that provides tactile feedback to the writing device may be repeated until the writing, drawing, and/or painting is completed. It should be noted that the use of the term "current placement" may refer to a recent placement, such as due to time delays in processing data.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a client writing device;
   one or more processors;
   memory that stores code executable by the one or more processors, the code comprising:

code that receives destination data corresponding to a destination placement for the client writing device;
code that receives current data corresponding to a current placement of the client writing device; and
code that controls a mechanism that provides tactile feedback to the client writing device to direct the client writing device from the current placement toward the destination placement as a function of at least the destination data and the current data, wherein the mechanism that provides the tactile feedback to the client writing device directs the client writing device to guide an action selected from the group consisting of a writing, a drawing, and a painting.

2. The apparatus of claim 1, wherein the destination placement comprises a destination position, and the current placement comprises a current position.

3. The apparatus of claim 1, wherein the destination placement comprises a destination orientation, and the current placement comprises a current orientation.

4. The apparatus of claim 1, wherein the code that receives the destination data receives the destination data from a master writing device, and wherein the client writing device mimics the motion of the master writing device based at least partly on the destination data received from the master writing device.

5. The apparatus of claim 1, wherein the client writing device is selected from the group consisting of a pen, a pencil, a marker, a stylus, a crayon, and a brush.

6. The apparatus of claim 1, wherein the apparatus is an apparatus selected from the group consisting of a tablet, a mobile phone, a handheld electronic device, a laptop, and a personal computer.

7. The apparatus of claim 1, wherein the code that controls the mechanism that provides the tactile feedback further calculates a time delay that is used to provide the tactile feedback, wherein the time delay compensates for time lag due to a master writing device providing the destination data from a location remote from the client writing device.

8. A method comprising:
receiving, by use of a processor, destination data corresponding to a destination placement for a client writing device;
receiving current data corresponding to a current placement of the client writing device; and
controlling a mechanism that provides tactile feedback to the client writing device to direct the client writing device from the current placement toward the destination placement as a function of at least the destination data and the current data, wherein the mechanism that provides the tactile feedback to the client writing device directs the client writing device to guide an action selected from the group consisting of a writing, a drawing, and a painting.

9. The method of claim 8, wherein controlling the mechanism that provides tactile feedback to the client writing device further comprises controlling the mechanism to provide tactile feedback to the client writing device selected from the group consisting of a pen, a pencil, a marker, a stylus, a crayon, and a brush.

10. The method of claim 8, wherein receiving the destination data further comprises receiving the destination data via the client writing device, wherein receiving the current data further comprises receiving the current data via the client writing device, and wherein controlling the mechanism that provides the tactile feedback to the client writing device further comprises controlling the mechanism via the client writing device.

11. The method of claim 8, wherein controlling the mechanism that provides the tactile feedback to the client writing device further comprises controlling the mechanism to one or more of provide directional tactile feedback, provide an increase in tactile feedback, and provide a decrease in tactile feedback.

12. The method of claim 8, wherein receiving the destination data further comprises receiving one or more of a destination angle, a destination pressure, and a destination direction.

13. The method of claim 8, wherein receiving the destination data further comprises receiving data from memory.

14. The method of claim 8, wherein receiving the destination data further comprises receiving data sensed using a camera.

15. The method of claim 8, wherein receiving the destination data further comprises receiving data corresponding to a current placement of a master writing device.

16. The method of claim 8, wherein controlling the mechanism that provides the tactile feedback to the client writing device further comprises controlling a motor within the client writing device.

17. A program product comprising a computer readable storage medium that stores code executable by a processor, the executable code comprising code to perform:
receiving destination data corresponding to a destination placement for a client writing device;
receiving current data corresponding to a current placement of the client writing device; and
controlling a mechanism that provides tactile feedback to the client writing device to direct the client writing device from the current placement toward the destination placement as a function of at least the destination data and the current data, wherein the mechanism that provides the tactile feedback to the client writing device directs the client writing device to guide an action selected from the group consisting of a writing, a drawing, and a painting.

18. The program product of claim 17, wherein the code that performs receiving the destination data further performs receiving one or more of a destination angle, a destination pressure, and a destination direction.

19. The program product of claim 17, wherein the code that performs controlling the mechanism that provides the tactile feedback to the client writing device further performs controlling the mechanism to provide one or more of directional tactile feedback, an increase in tactile feedback, and a decrease in tactile feedback.

20. The program product of claim 17, wherein the code that performs controlling the mechanism that provides the tactile feedback to the client writing device further performs controlling a motor within the client writing device.

* * * * *